(12) United States Patent
Krishnamurthy et al.

(10) Patent No.: US 9,979,638 B2
(45) Date of Patent: May 22, 2018

(54) SYSTEMS AND METHODS TO CONSTRUCT ENGINEERING ENVIRONMENT SUPPORTING API ENABLEMENT FOR SOFTWARE DEFINED NETWORKING

(71) Applicant: HCL Technologies Limited, Chennai (IN)

(72) Inventors: Shashidhar Krishnamurthy, Noida (IN); Anurag Jain, Noida (IN); Mukta Agarwal, Noida (IN); Saurabh Chattopadhyay, Noida (IN)

(73) Assignee: HCL TECHNOLOGIES LIMITED, Chennai (IN)

( * ) Notice: Subject to any disclaimer, the term of this patent is extended or adjusted under 35 U.S.C. 154(b) by 371 days.

(21) Appl. No.: 14/228,299

(22) Filed: Mar. 28, 2014

(65) Prior Publication Data

US 2014/0379885 A1    Dec. 25, 2014

(30) Foreign Application Priority Data

Jun. 19, 2013  (IN) .......................... 2671/CHE/2013

(51) Int. Cl.
 *G06F 15/173* (2006.01)
 *H04L 12/771* (2013.01)
 *H04L 12/725* (2013.01)
 *H04L 29/08* (2006.01)

(52) U.S. Cl.
 CPC ............ *H04L 45/56* (2013.01); *H04L 45/306* (2013.01); *H04L 67/2819* (2013.01); *H04L 69/329* (2013.01)

(58) Field of Classification Search
 CPC .......................... H04L 41/5054; H04L 45/46
 USPC ........................................................ 709/223
 See application file for complete search history.

(56) References Cited

U.S. PATENT DOCUMENTS

| | | | | |
|---|---|---|---|---|
| 6,182,246 B1 * | 1/2001 | Gregory | ............... | G06F 11/263 714/38.14 |
| 6,658,600 B1 * | 12/2003 | Hogdal | ............... | G06F 11/3664 714/33 |
| 7,480,916 B2 * | 1/2009 | Beisiegel | ............... | G06Q 10/06 717/100 |
| 8,234,620 B1 * | 7/2012 | Bychkov | ................... | G06F 8/00 717/100 |
| 8,429,297 B1 * | 4/2013 | Lim | ........................ | H04L 67/16 709/206 |

(Continued)

*Primary Examiner* — Kevin Bates
*Assistant Examiner* — Clarence McCray
(74) *Attorney, Agent, or Firm* — HM Law Group LLP; Vani Moodley, Esq.

(57) ABSTRACT

The embodiments herein relate to software defined networking (SDN) and, more particularly, to a system and method to construct an engineering environment for API enablement in Software defined networking. The system enables the device use SDN functionality by designing an API model specific to that device. In order to design the device specific API model, an API enablement system initially leverages functionality/capabilities of the device. Further, by analyzing the leveraged device capabilities, the system designs the API model for the device. After implementing the API model on the device, the system performs a review function to ensure that the designed API model is in compliance with set rules and policies. The API model may be refined based on results of the review function.

10 Claims, 8 Drawing Sheets

(56) References Cited

U.S. PATENT DOCUMENTS

| | | | |
|---|---|---|---|
| 8,595,186 B1* | 11/2013 | Mandyam | G06F 8/38 707/632 |
| 8,972,725 B2* | 3/2015 | Arun | H04L 41/5041 713/166 |
| 2002/0184610 A1* | 12/2002 | Chong | G06F 8/20 717/109 |
| 2004/0064593 A1* | 4/2004 | Sinclair | G06F 9/4443 709/250 |
| 2005/0076327 A1* | 4/2005 | Helal | G06F 8/20 717/100 |
| 2009/0157485 A1* | 6/2009 | Thakker | G06Q 10/06311 705/7.13 |
| 2009/0171474 A1* | 7/2009 | Birze | G05B 19/042 700/3 |
| 2009/0182565 A1* | 7/2009 | Erickson | G06Q 10/06 705/300 |
| 2012/0030354 A1* | 2/2012 | Razzaq | G06F 21/335 709/225 |
| 2012/0144416 A1* | 6/2012 | Wetzer | H04N 21/25816 725/14 |
| 2013/0036197 A1* | 2/2013 | Chan | G06F 17/30905 709/217 |
| 2013/0111336 A1* | 5/2013 | Dorman | G06F 9/4843 715/255 |
| 2013/0132584 A1* | 5/2013 | Palladino | H04L 65/40 709/226 |
| 2014/0082582 A1* | 3/2014 | Houck | G06F 8/30 717/101 |
| 2014/0289702 A1* | 9/2014 | McMahon | G06F 21/60 717/120 |
| 2014/0317681 A1* | 10/2014 | Shende | H04L 63/10 726/1 |

* cited by examiner

SYSTEMS AND METHODS TO CONSTRUCT ENGINEERING ENVIRONMENT SUPPORTING API ENABLEMENT FOR SOFTWARE DEFINED NETWORKING

The present application is based on, and claims priority from, IN Application Number 2671/CHE/2013, filed on 19 Jun. 2013, the disclosure of which is hereby incorporated by reference herein.

TECHNICAL FIELD

The embodiments herein relate to software defined networking (SDN) and, more particularly, to a system and method to construct an engineering environment for API enablement for Software defined networking.

BACKGROUND

Software Defined Networking (SDN) is an approach to networking in which control plane is separated from data plane and control plane is implemented in a software application called controller. SDN controller which initiates and manages and terminates the traffic in the network environment such as network virtualization, network monitoring, flow balancing, etc.

With the inception of Software Defined Networking (SDN) technologies, network industry already started adopting SDN. It is very expensive to replace all the conventional network products which do not support SDN functionality. Vast ranges of legacy products now require simpler and effective way to support programmability for a flexible deployment in networked environment. While Telecom Networking & Server Storage elements become the primary candidate for adopting the programmability support, other specialized elements like medical devices, office automation elements, aerospace devices, networked automobile devices and the firmware & chip based platforms are also experiencing the need to support programmability for more flexible deployment in the specialized networks. Thus, a need to extend the capabilities of the legacy products is necessary.

There is a need for a system and method to provide programmability support for legacy products which already exist in the market.

SUMMARY

In view of the foregoing, an embodiment herein provides a method of enabling Application Programming Interface (API) support for a device; the method comprises leveraging capabilities of the device; designing an API model based on the leveraged device capabilities; reviewing the designed API model; and implementing the API model on the device.

Embodiments further disclose a system of enabling Application Programming Interface (API) support for a device; the system configured for leveraging capabilities of the device using an IDE server; designing an API model based on the leveraged device capabilities using the IDE server; reviewing the designed API model using the IDE server; and implementing the API model on the device using the IDE server.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method to construct an engineering environment to enable software defined networking (SDN) of a legacy product/device, which does not have SDN capability. Referring now to the drawings, and more particularly to FIG. 1 through 7, where similar reference characters denote corresponding features consistently throughout the figures, there are shown embodiments.

Figure 1:
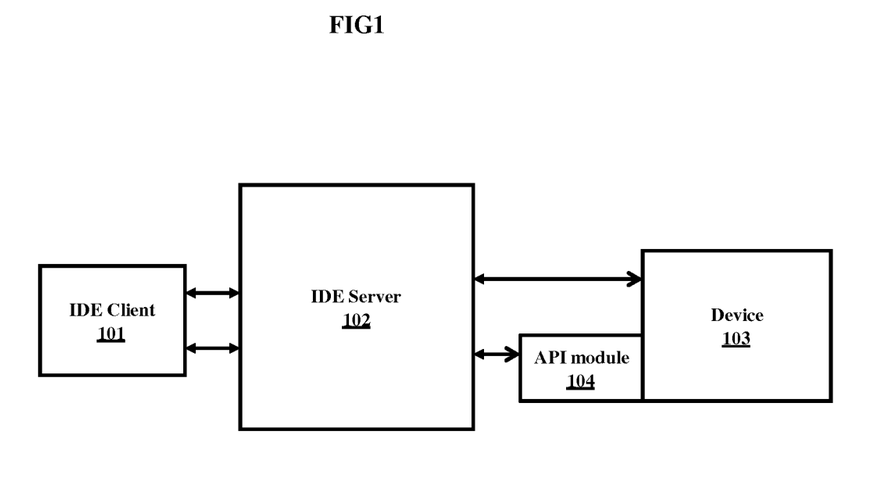
FIG. 1 illustrates a block diagram of a Application Programming Interface (API) enablement system, as disclosed in the embodiments herein.

FIG. 1 illustrates a block diagram of a Application Programming Interface (API) enablement system, as disclosed in the embodiments herein. The API enablement system 100 comprises an IDE client 101, an IDE server 102, a device 103 and an API module 104. The IDE client 101 represents a front end system which may act as an interface to access, monitor and control any operations or functionalities of the IDE server 102 and the device 103. The device 103 may refer to any device such as router which has to be provided with the SDN functionality. In a preferred embodiment, all communication between the device 103 and the IDE client 101 is through the IDE server 102. In another embodiment, the IDE client 101, IDE server 102 and the device 103 may be communicating using a suitable interface such as a web based interface.

An API enablement environment is set up by connecting the device 103, IDE client 101 and the IDE server 102 as depicted in the FIG. 1. The API enablement system 100 helps the device 103 to use the SDN functionality by designing a API module 104 that matches configuration of the device 103. The process of designing the API module 104 for the device 103 involves two phases namely analysis and design phase and a review phase. In the analysis and design phase, the IDE server 102 initially identifies capabilities of the device 103 by fetching, analyzing and processing specific data from the device 103. Further, based on the identified device capabilities, the IDE server 103 designs an API module 104 with compliance for certain pre-defined rules and policies so as to enable the device 103 use the desired SDN functionality. The designed API module 104 is implemented on top of the device 103 and further in the review phase, the IDE server 102 conducts specific tests and checks whether the designed API module 104 is in compliance with the defined set of rules and policies.

Figure 2:
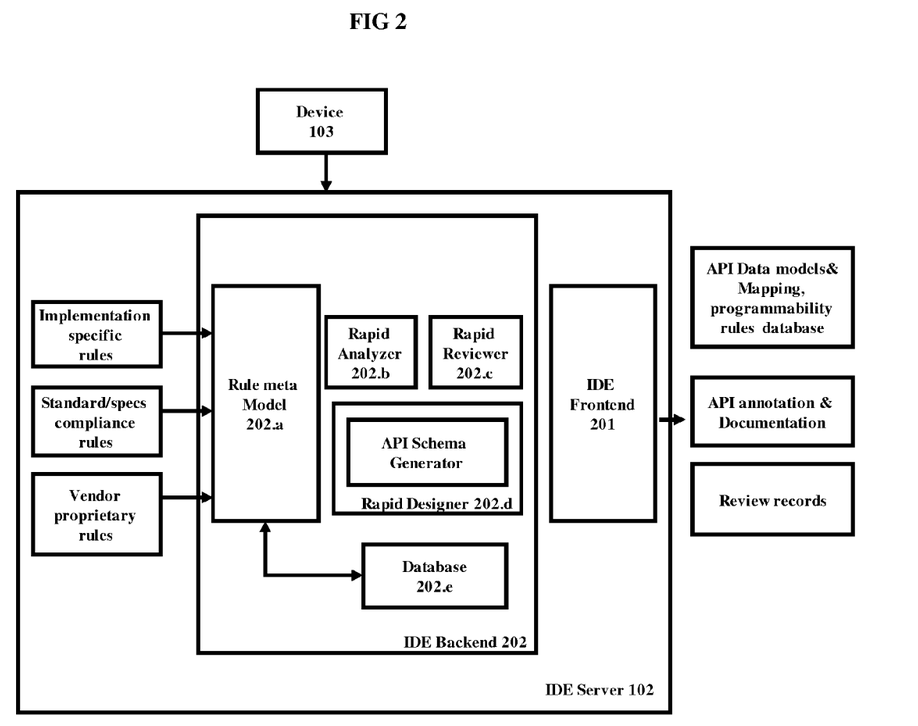
FIG. 2 illustrates a block diagram which shows various components of Integrated Development Environment (IDE) in the API enablement system, as disclosed in the embodiments herein.

FIG. 2 illustrates a block diagram which shows various components of Integrated Development Environment (IDE) server in the API enablement system, as disclosed in the embodiments herein. The IDE server 102 comprises of an IDE frontend 201 and an IDE backend 202. The IDE backend 202 further comprises of a rule meta model 202.*a*, a rapid analyzer 202.*b*, a rapid reviewer 202.*c*, a rapid designer 202.*d* and a database 202.*e*. The IDE frontend 201 provides means for any authorized user to remotely connect and access the device 103 and the IDE server 102 for providing any input or control commands required for the system. In a preferred embodiment, two set of inputs are required by the system; a first set being monitoring, control and management commands required to evaluate the device's 103 existing capabilities and the second set being a set of rules that are required to ensure that an API schema generated for that particular device 103 is meeting a required level of compliance for standard as well as proprietary rules.

The rule meta model 202.*a* is designed based on inputs such as implementation specific rules, standard specification compliance rules, vendor specific rules and so on. The rule meta model 202.*a* provides options to define rules at functional, module and attribute levels and set priorities to provide overwriting criteria required for rule enforcement.

The rapid analyzer 202.*b* is responsible for determining discoverable, monitor-able, configurable methods for programmability, and Identification of mandatory attributes for rules and policy compliance. When the analysis and design phase is initiated, the rapid analyzer 202.*b* intercepts command and control signals/data from the network connected to device 103, inspects and develops a knowledge-base on available monitoring and control capabilities supported in the device 103. The rapid analyzer 202.*b* further identifies mode of communication required to carry out the command and control activities, and details out the attribute level support along with boundaries and validations.

The rapid designer 202.*d* is responsible for meta-model based referencing of APIs; dictionary linked annotations, and integrating validation rule/remarks into the API design. The rapid designer 202.*d* may compare identified command and control APIs against data in the rule meta model 202.*a* and assesses the level of compliance and non-compliance. Further, based on the assessment, the rapid designer 202.*d* annotates and generates a schema of supported APIs for the device 103. In a preferred embodiment, the schema may be device specific and may depend on capabilities of the device 103. In another embodiment, identical devices or different devices 103 having same set of capabilities/functionalities may have same set of API schema.

Once the schema has been generated, the rapid reviewer 202.*c* performs a review operation to ensure that the designed/generated schema is in compliance with set rules/policies. The review operation may involve a reverse validation of designed APIs, cross comparison of command & control communication, and reviewing of rules and policy compliance. The review may be performed by initiating specific command and control operations by executing specific unit tests in the device, monitoring ongoing communication in the device 103 and mapping the same onto the designed API data model. Further, the rapid reviewer 202.*c* refers to the enforced rules and validations applicable for the relevant tests, and conducts the unit tests in different system condition to review the results in maximum possible network scenarios.

Further, based on the analysis results, the system designs the structure of API module 104 with data associated with API data model and mapping, refined/selected programmability rules and API annotation and documentation. Further, results and other data associated with each review function is recorded as "review records".

Figure 3:
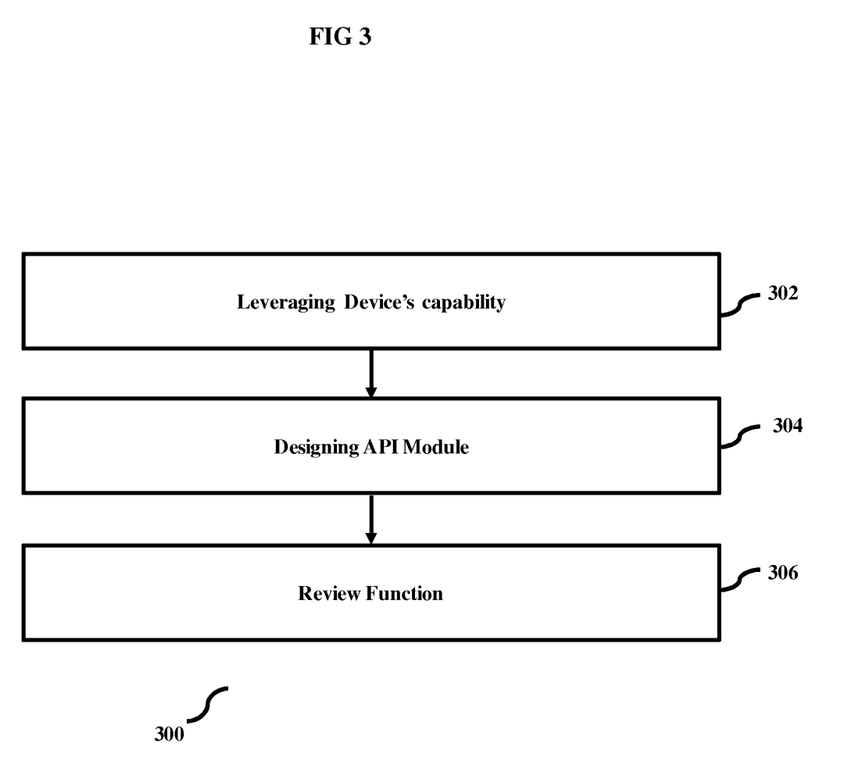
FIG. 3 is a flow diagram which shows various steps involved in the process of enabling SDN on a device using API enablement system, as disclosed in the embodiments herein.

FIG. 3 is a flow diagram which shows various steps involved in the process of enabling SDN on a device using API enablement system, as disclosed in the embodiments herein. The SDN enablement system enabled a non SDN device 101 to use SDN functionality by creating a wrap-around layer which is then implemented on top of the device 103 in the form of API module 104. The API module may be device specific and is designed based on capabilities of the device 101. Initially, the SDN enablement system leverages (302) the device's capabilities. During this process, the device's capabilities are analyzed and reviewed. Further, the leveraged information is analyzed and requirements to enable the device 101 to use SDN functionality are identified. Based on the identified requirements, the API module 104 is designed (304) and the specifications and capabilities to enable the device 101 to use the SDN functionality are associated with the API data model and mapping model and programmability rules in the API module 104. Further, assessment of unit test results fetched after executing the unit tests on the device 103 are iteratively done for each such emulation of progressive conditions against the API calls, and the feedback/results of the test are stored as review records. The review records may be then taken up as input for further refinement of API enablement functionalities. Further, the records and/or functionalities of the API module 102 are reviewed (306) to check and verify that all required compliance are met. The review process may also be used to update the API data model and mapping model and programmability rules, if required. The API module 104 is then connected to the device 103 which further acts as a layer that provides SDN functionality to the device 101. The various actions in method 300 may be performed in the order presented, in a different order or simultaneously. Further, in some embodiments, some actions listed in FIG. 3 may be omitted.

Figure 4:
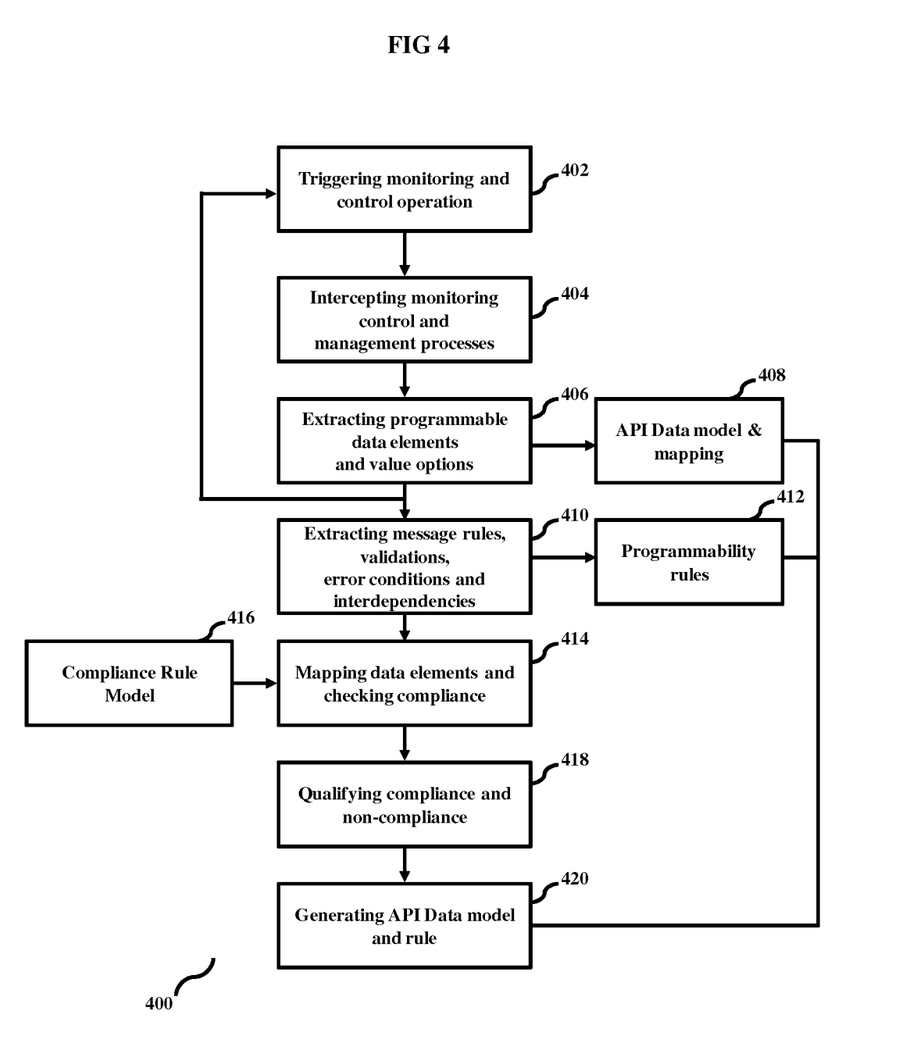
FIG. 4 is a flow diagram which shows various steps involved in the process of analyzing device functionality and designing API module for the device, as disclosed in the embodiments herein.

FIG. 4 is a flow diagram which shows various steps involved in the process of analyzing device functionality and designing API module for the device, as disclosed in the embodiments herein. Initially, a any authorized user may trigger (402) the IDE server 102 in the backend to initiate a monitoring, control and management communication with the device 103. The IDE server 102 intercepts (404) all control and management communication with the device 103 and analyzes the intercepted/fetched data for message headers and message contents. For example, the mode of communication may rely on specific protocols such as Command Line Interface (CLI), HTTP, SNMP, and NETCONF and so on for command console based access, for accessing embedded system management process and so on. By analyzing the intercepted messages, the IDE server 102 accesses protocol agents corresponding to each communication associated with the device 103.

After intercepting the messages, the IDE server 102 extracts (406) programmable data elements and value options. In a preferred embodiment, manual trigger to all possible control and command options may be required to ensure proper coverage on discovery of the programmable data elements. In addition to the programmable data elements, the IDE server 102 also extracts (410) information on message rules, validations, error conditions, interdependencies and so on. Further, using the extracted information, the IDE server 102 builds a knowledge base of all scenarios which may be stored in the database 202.e. Further, the data in the database 202.e may be analyzed and inspected to identify various possible message exchanges.

In a preferred embodiment, the analysis and inspection of messages is iterated until data required to build the API model is obtained. The API model is built (408) by considering data such as extracted messaging rules, validations, error conditions, interdependencies and so on. Once the API model is built, compliance of the model with standard rules is to be checked. In a preferred embodiment, the compliance of the model is checked by mapping (414) the created API model with a pre-defined functional, module based and attribute based compliance rule model (416). In a preferred embodiment, the IDE server 102 automatically performs a text matching of attributes and identifies resolved and unresolved attributes. Further, the IDE server 102 may report the unresolved attributes to the user via the frontend 201 and the user may perform a manual mapping for the unresolved ones. Once the mapping is finished, the IDE server 102 checks for compliance of all mapped functions, modules and attributes for which a compliance rule definition exists and level of compliance has been qualified (418). The IDE server 102 also identifies attributes for which compliance could not be achieved and annotates them as a part of an API documentation which in turn may be reported to the IDE frontend 201. Further, the IDE server 102; by using the attributes that are in compliance with the pre configured rules and policies; generates (420) an API model and programmability rules which are refined according to capabilities of the device 103. Various attributes associated with the generated API model is stored as API data model & mapping and information on programmability rules is also maintained as a part of the API data model. The various actions in method 400 may be performed in the order presented, in a different order or simultaneously. Further, in some embodiments, some actions listed in FIG. 4 may be omitted.

Figure 5:
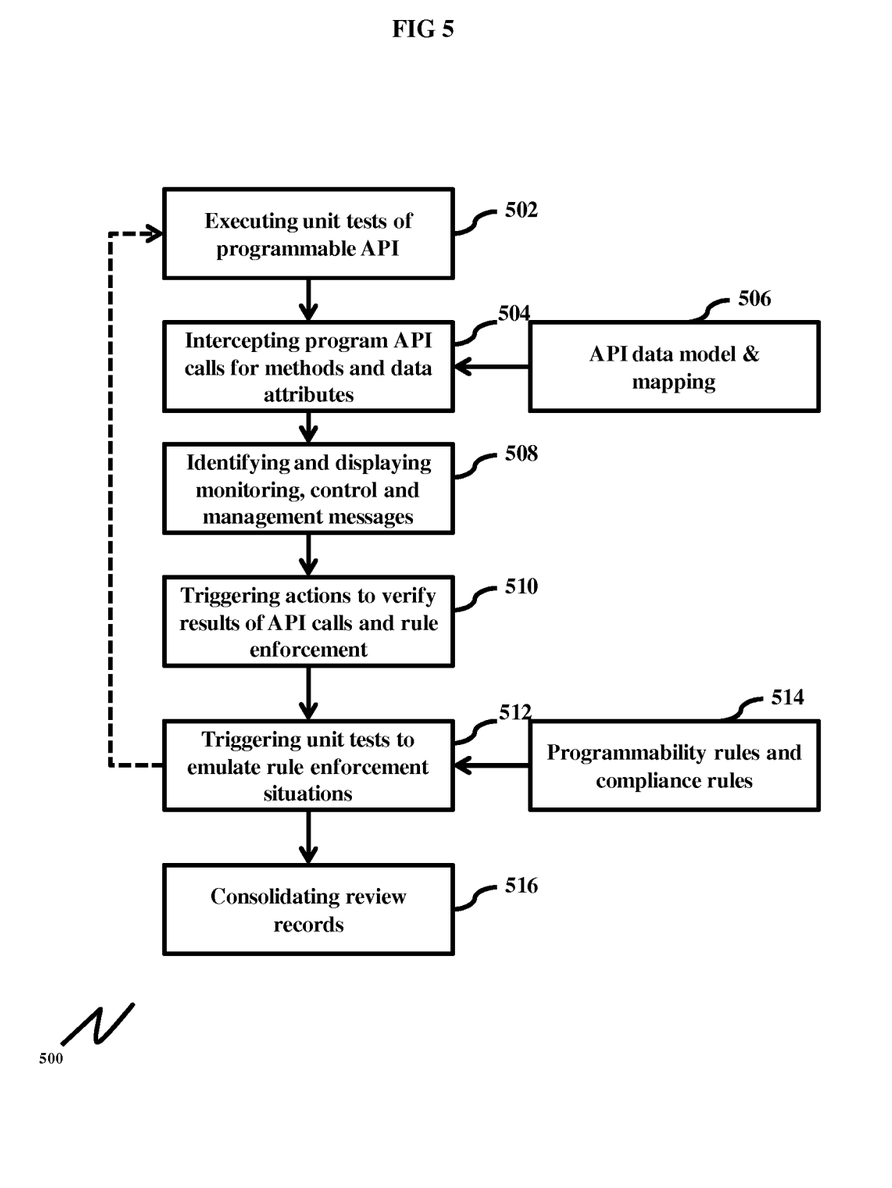
FIG. 5 is a flow diagram which shows various steps involved in the process of reviewing API model of a device, as disclosed in the embodiments herein.

FIG. 5 is a flow diagram which shows various steps involved in the process of reviewing API model of a device, as disclosed in the embodiments herein. The API model designed for the device 103 may be checked for compliance with the pre-configured rules and policies by fetching and analyzing API calls related to control and management functions from and to the device 103 via the API module 104. To initiate the review process, at least one unit test developed for the API model under test is executed (502) on the device 103. In a preferred embodiment, the unit test execution may be triggered manually from the IDE client 101 and corresponding calls may get routed via the IDE server 102.

After executing the unit tests, the IDE server 102 intercepts (504) API calls generated as a part of the test case execution and analyze the intercepted calls to identify (508) methods and attributes used in the calls. In a preferred embodiment, the API data model and mapping database comprise information on various attributes associated with the generated API model. Now, a manual trigger is initiated from the IDE client 101 so as to verify results and to perform a compliance check of API calls and rule enforcement. In a preferred embodiment, the IDE server 102 performs a reverse mapping during which equivalent command and control messages that are reversely mapped with a set of APIs are identified by the IDE server 102. A manual check may be required to verify (510) results of the reverse mapping process and results of API calls made during execution of unit tests. After successful completion of the verification process, the IDE server refers the database of programmability and compliance rules (514) so as to identify any associated scenario that can potentially raise a validation, error condition and/or compliance rule enforcement situation for the invoked APIs.

Upon identifying any issue, the IDE server triggers (512) specific unit tests so as to emulate the identified error/validation or enforcement condition. Further, assessment of unit test results may be done on an iterative manner and results may be consolidated (516) to form review records. The review records may be then used as input for further refinement of the API model designed for the device 103. The various actions in method 500 may be performed in the order presented, in a different order or simultaneously. Further, in some embodiments, some actions listed in FIG. 5 may be omitted.

Figure 6:
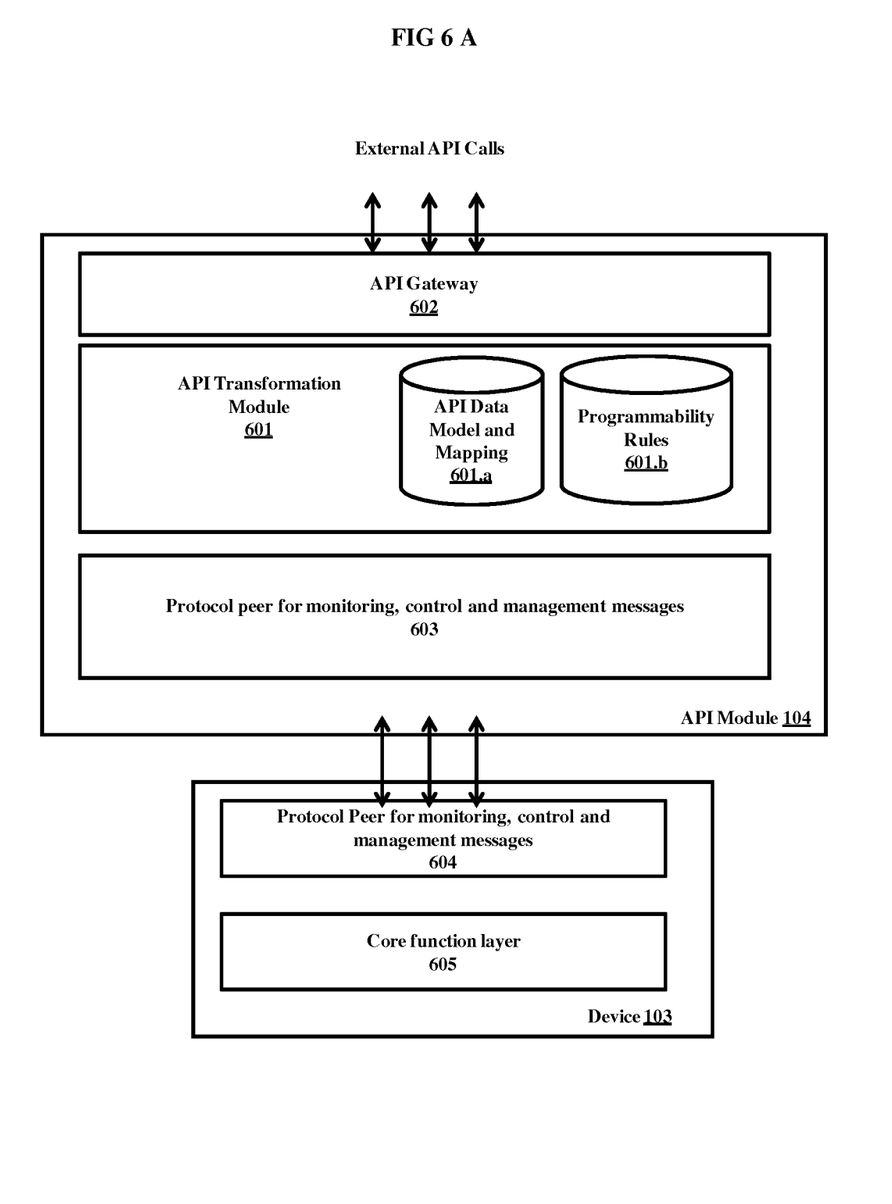
FIGS. 6A and 6B illustrate block diagrams which shows external and internal implementation of the API module in the SDN enablement system, as disclosed in the embodiments herein.
Figure 6B:
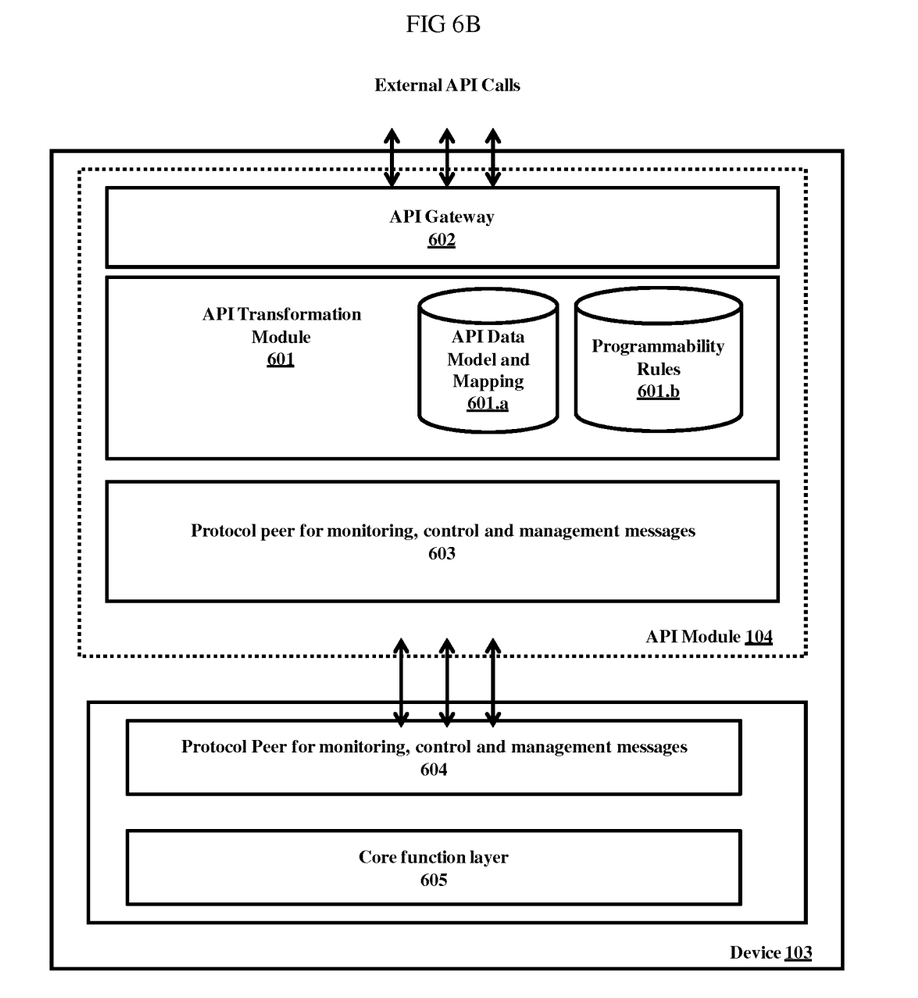

FIGS. 6A and 6B illustrate block diagrams which shows different implementations of the API module in the SDN enablement system, as disclosed in the embodiments herein. FIG. 6 A illustrates an external implementation mode in which the API module 104 is connected external to the device 103. The API Module 104 further comprises of an API Gateway 602 and an API Transform Module 601, which are pre-built components that are independent of device's programmability characteristics. These modules are designed to be reused repetitively for providing support for API enablement for multiple devices 103, while being used in the scope of this engineering environment as defined in the embodiment. During execution, API Gateway 602 accepts the API calls originated from external systems and implements an API call bearing protocol as per the requirements of deployment environment and product owners. The communication protocol used may be any suitable protocol such as RESTful Web Services so as to expose the APIs to the external system. Thus, in the defined architecture, API Gateway 602 accepts the protocol specific communication and transfers the API method calls and attributes to the following layer i.e. the API Transform Module 601. The API Transform Module 601 receives the API call details and matches with its database on API Data Model & Mapping and Programmability Rules, and recognizes the transformation requirements to command syntax and semantics specific to the device 103. The Database on API Data Model & Mapping clarifies which API method call from external system shall be mapped to device specific command & control communication and how the API data attributes will be mapped to device's command & control parameters. Further, the programmability rules database provides clarity on the kind of rules to be enforced on incoming pre-set API calls for policy compliance, validation and error handling purposes. The API Transform module 601 depends on the databases created for the particular device 103 to interoperate with the device 103 in appropriate way. The Protocol peer for monitoring, control & management plane communication component with the device 103 can be standard or custom built, depending on the nature of protocol support available in the device 103. API Transform module 601 passes on the API method and attributes data-structures to this protocol peer for further communication with the other peer hosted in the device 103. The response obtained from the device 103 is then passed on to the API Transform module 601 and response method and attributes are further transformed to API Data Model mapped methods and attributes. Respective programmability rules for the response methods and attributes are enforced before passing on the resultant response to the API Gateway module 602. The API Gateway module 602 then sends back the response to the external system from where the original API call was originated. In another embodiment, the API module 104 may be built as a component of the device 103 as depicted in FIG. 6B. For example, the API module 104 may be embedded as an add-on in the device 103. The preferred deployment model will depend on product's capability to host add-on module, available processing capacity and memory footprints, implementer's and product vendor's preference and commercial agreements.

Figure 7:
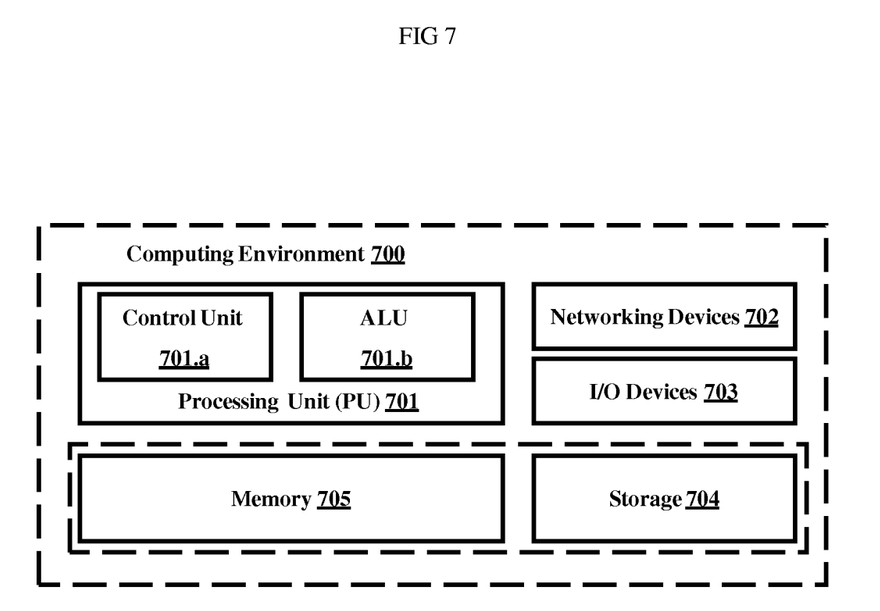
FIG. 7 illustrates a computing environment implementing the API enablement system, according to embodiments as disclosed herein.

FIG. 7 illustrates a computing environment implementing the automation of application certification process, according to embodiments as disclosed herein. The computing environment can implement the engineering environment in which the API model is designed and it can also implement the API module 104 wherein the API module may be hosted in an external system in the implementation scenario being considered. As depicted the computing environment 700 comprises at least one processing unit 701 that is equipped with a control unit 701.a and an Arithmetic Logic Unit (ALU) 701.b, a memory 705, a storage unit 704, plurality of networking devices 702 and a plurality Input output (I/O) devices 703. The processing unit 701 is responsible for processing the instructions of the algorithm. The processing unit 701 receives commands from the control unit in order to perform its processing. Further, any logical and arithmetic operations involved in the execution of the instructions are computed with the help of the ALU 701.b.

The overall computing environment 700 can be composed of multiple homogeneous and/or heterogeneous cores, multiple CPUs of different kinds, special media and other accelerators. The processing unit 701 is responsible for processing the instructions of the algorithm. Further, the plurality of processing units 701 may be located on a single chip or over multiple chips. The algorithm comprising of instructions and codes required for the implementation are stored in either the memory unit 705 or the storage 704 or both. At the time of execution, the instructions may be fetched from the corresponding memory 705 and/or storage 704, and executed by the processing unit 701. In case of any hardware implementations various networking devices 702 or external I/O devices 703 may be connected to the computing environment to support the implementation through the networking unit and the I/O device unit.

The embodiments disclosed herein can be implemented through at least one software program running on at least one hardware device and exposing programmable functions to control the elements. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method of enabling Application Programming Interface (API) support for a device, said method comprising:
   determining, by an IDE server, at least one capability of said device, by triggering a control, monitoring, and management communication between said device and said IDE server,
   intercepting said control, monitoring, and management communication to fetch message data associated to said control, monitoring, and management communication, and
   analyzing the message data to extracts at least one of a plurality of programmable data elements, at least one of a validation condition, error condition, and interdependency condition thereby determining the at least one capability of said device: building, by the IDE server, a knowledge database, using said at least one of a plurality of programmable data elements, said at least one of a validation condition, error condition, and interdependency condition;
   generating, by the IDE server, an API model for said device based on said knowledge database, wherein the generating further comprises:
   mapping a plurality of attributes of said designed API model against predefined rules and policies model;
   checking compliance of a subset of the plurality of attributes upon referring to the predefined rules and policies model wherein the subset indicates one or more attributes mapped with at least one predefined attribute, present in the predefined rules and policies model, and
   generating the API model for said device upon determining one or more attributes, of the subset, complied in accordance with predefined rules and policies;
   reviewing said API model by said IDE server; and
   implementing said API model on said device by said IDE server.

2. The method as in claim 1, wherein said reviewing of the API model further comprises:
   executing at least one-unit test, developed for the API model, in an iterative manner on said device to generate an API call;
   analyzing the API call to determine one or more attributes used in the API call;
   verifying whether a result of the API call complying in accordance with predefined rules and policies model present in the predefined rules and policies model; and
   refining said API model based on the predefined rules and policies model until the result of API call complied in accordance with predefined rules and policies model.

3. The method as in claim 2, wherein said predefined rules and policies are pre-configured.

4. The method as in claim 1, wherein said compliance check further comprises of reverse mapping of commands and controls with a plurality of APIs identified by said IDE server.

5. The method of claim 1, wherein the message data indicates a protocol used for said control, monitoring, and management communication, and wherein the protocol is one of a Command Line Protocol (CLI), a Simple Network Management Protocol (SNMP), a Hypertext Transfer Protocol (HTTP), and a Network Configuration Protocol (NETCONF).

6. A system of enabling Application Programming Interface (API) support for a device, said system comprising:
   a hardware processor; and
   at least one of a memory unit, wherein said at least one of said memory unit comprises a plurality of instructions, said instructions configured to cause said hardware processor to:
   determine at least one capability of said device by:
   triggering a control, monitoring, and management communication between said device and said IDE server,
   intercepting said control, monitoring, and management communication to fetch message data associated to said control monitoring, and management communication, and
   analyzing the message data to extract at least one of a plurality of programmable data elements, at least one of a validation condition, error condition and interdependency condition thereby determining the at least one capability of said device,
   build a knowledge database using said at least one of a plurality of programmable data elements, said at least one of a validation condition, error condition, and interdependency condition,
   generate an API model for said device based on said knowledge database, wherein the API model is further generated by,
   mapping a plurality of attributes of said designed API model against a predefined rules and policies model;
   checking compliance of a subset of the plurality of attributes upon referring to the predefined rules and policies model, wherein the subset indicates one or more attributes mapped with at least one predefined attribute, present in the predefined rules and policies model, and
   generating the API model for said device upon determining one or more attributes, of the subset, complied in accordance with predefined rules and policies;
   review said API model by said IDE server; and
   implement said API model on said device using said IDE server.

7. The system as in claim 6, wherein said IDE server is further configured to review said API model by:
   executing at least one-unit test developed for the API model in an iterative manner on said device to generate an API call;
   analyzing the API call to determine one or more attributes used in the API call;
   verifying whether a result of the API call complying in accordance with predefined rules and policies model present in the predefined rules and policies model; and
   refining said API model based on the predefined rules and policies model until the result of API call complied in accordance with predefined rules and policies model.

8. The system as in claim 7, wherein said IDE server is further configured to provide at least an option for pre-configuring said predefined rules and policies.

9. The system as in claim 6, wherein said IDE server is further configured to perform said compliance check by reverse mapping of commands and controls with a plurality of identified APIs.

10. The system as in claim 6, wherein said system is configured for implementing said API model externally to said device or internally to said device.

* * * * *